(No Model.)
F. J. BALL.
STRAWBERRY SHORT CAKE BAKE PAN.
No. 495,872. Patented Apr. 18, 1893.
Fig. I.
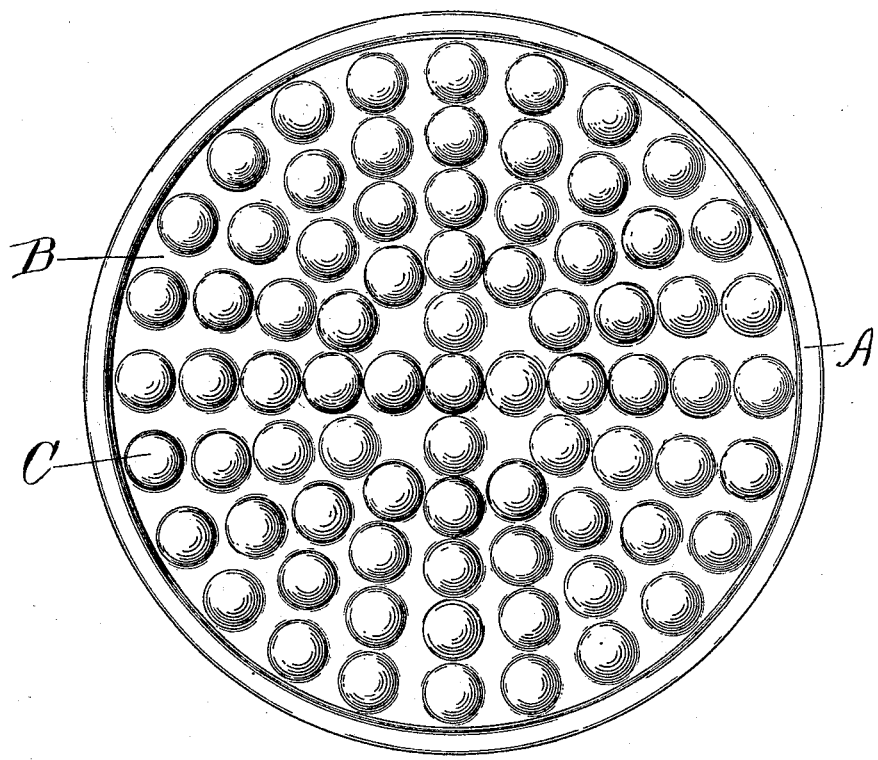
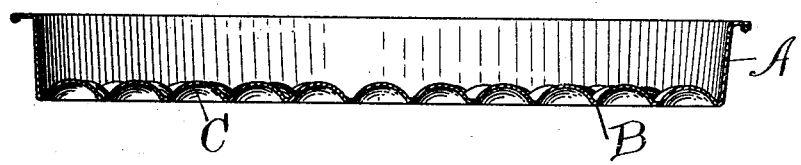
Fig. II.
Witnesses
M. V. Bidgood
J. E. Martin
Inventor
Frederic J. Ball
By Knight Bros.
Attys.

UNITED STATES PATENT OFFICE.

FREDERIC J. BALL, OF BROOKLYN, NEW YORK.

STRAWBERRY-SHORT-CAKE BAKE-PAN.

SPECIFICATION forming part of Letters Patent No. 495,872, dated April 18, 1893.

Application filed August 20, 1892. Serial No. 443,592. (No model.)

*To all whom it may concern:*

Be it known that I, FREDERIC J. BALL, a citizen of the United States, residing at Brooklyn, county of Kings, State of New York, have invented certain new and useful Improvements in Strawberry-Short-Cake Bake-Pans, of which the following is a specification.

The invention relates to a utensil or pan for the reception of pastry, dough or other material to be cooked or baked and consists essentially of independent stamped up portions elevations adapted to form complementary impressions or pockets in the article to be cooked.

The invention is specifically designed for the layers of cake which are used in the manufacture of strawberry shortcake.

Referring to the accompanying drawings which form part of this specification:—Figure I is a plan view of my invention and Fig. II a cross section thereof.

In the figures, A is the pan, B the bottom thereof and C the stamped up and rounded portions or elevations which are adapted to form the complementary portions or pockets in the cake or other material to receive the strawberries or other fruit.

It will be seen that this invention is adapted for the purpose I have described it and I will state that it may be modified in various ways and without departing from the spirit of my invention.

Having thus described my invention, the following is what I claim as new therein and desire to secure by Letters Patent:

A strawberry short-cake bake pan provided with a series of independent pocket-forming elevations in its bottom, substantially as set forth.

FREDERIC J. BALL.

Witnesses:
RALPH HINDLEY,
THOS. J. KEENAN.